United States Patent [19]

Aharonson et al.

[11] Patent Number: 5,623,285

[45] Date of Patent: *Apr. 22, 1997

[54] METHOD OF AND STATION FOR INTEGRATED TYPED DATA AND OPTICALLY SCANNED DATA CAPTURE FOR COMPUTER INTERFACING AND THE LIKE

[76] Inventors: Ophira R. Aharonson; Dov Aharonson, both of 9 Fessenden Way, Lexington, Mass. 02173

[*] Notice: The term of this patent shall not extend beyond the expiration date of Pat. No. 5,477,238.

[21] Appl. No.: 472,573

[22] Filed: Jun. 7, 1995

Related U.S. Application Data

[60] Division of Ser. No. 251,743, May 31, 1994, Pat. No. 5,477,238, which is a continuation-in-part of Ser. No. 835,229, Feb. 13, 1992, abandoned.

[51] Int. Cl.$^6$ .................................................. H04N 1/04
[52] U.S. Cl. ........................... 345/168; 358/474; 361/680
[58] Field of Search ................................. 345/168, 169; 358/400, 444, 438, 474, 498; 400/88; 361/680

[56] References Cited

U.S. PATENT DOCUMENTS

| | | | |
|---|---|---|---|
| 4,831,457 | 5/1989 | Watanabe et al. | 358/444 |
| 5,115,374 | 5/1992 | Hongoh | 358/400 |
| 5,475,504 | 12/1995 | Ogura et al. | 358/474 |
| 5,477,238 | 12/1995 | Aharanson et al. | 358/474 |
| 5,499,108 | 3/1996 | Cotte et al. | 358/498 |

FOREIGN PATENT DOCUMENTS

230758  11/1985  Japan.

*Primary Examiner*—Steven Saras
*Attorney, Agent, or Firm*—Rines and Rines

[57] ABSTRACT

A novel integrated key board and optical scanner, preferably of shape and size corresponding to that of standard conventional keyboards, sharing common mechanical support and electrical and electronic functions, with features of optional attachment and detachment of the scanner from the keyboard, and use of both conventional and flat-bed scanner techniques.

7 Claims, 14 Drawing Sheets

| FIG. 7A |
| FIG. 7B |
| FIG. 7C |
| FIG. 7D |
| FIG. 7E |
| FIG. 7F |
| FIG. 7G |

METHOD OF AND STATION FOR INTEGRATED TYPED DATA AND OPTICALLY SCANNED DATA CAPTURE FOR COMPUTER INTERFACING AND THE LIKE

This application is a division of U.S. application Ser. No. 08/251,743, now U.S. Pat. No. 5,477,238 filed May 31, 1994 and in turn a continuation-in-part of Ser. No. 07/835,229, filed Feb. 13, 1992 is now abandoned.

The present invention relates to multi-function data capture devices for computers and the like, being more specifically concerned with data entry of both typed and similar documents and optically scanned image data into computer and other processing or similar systems.

BACKGROUND OF THE INVENTION

The art is replete with various methods of data capture for computerized data processing systems and the like, each using separate and different devices, such as:

a) the use of text input devices (keyboard) for data entry of typed edited alphanumeric documents;

b) the use of image capture devices (scanner) electronically to capture drawings, photographs and textual alphanumeric documents, such as scanners varying from hand scanners, page scanners to large scale drawing scanners;

c) the use of local and/or remote communication lines for transfer of data generated elsewhere by such devices above-mentioned.

Separate keyboards are very widely used as input and control devices adjacent computers and multi-processor systems and the like, each having a fixed number of keys, local indicator lamps, internal control units and a communication interface. The internal control unit monitors the keys, analyzes and filters the keystrokes and generates the appropriate codes sent through the communication port to the host computer. In addition, the control unit handles the indicator lamps on the keyboard. Examples of such are the following: Northgate OmniKey Keyboard (101N), 102, Ultra); Key Tronic 101 keyboards as described, for example, in their KB101 Plus and Eurotech brochures of 1992; Cherry; BTC 5339, FC3001. The generally used and accepted defacto standard keyboard contour and dimensions for such related keyboards, including also the IBM PC and 101 Keyboard of 101 keys, with variants such as the 102 key layout and the Apple 105 key layout, implies the wedge shape with a height dimension (with legs opened) from about 1" in the front up to about 3" in the rear, a length of the order of less than 21" and a depth of less than about 9". It is such that is herein referred to as a standard keyboard.

In the daily operations of any computerized enviroment, however, much of the data captured from external sources or from old files is in the form of printed documents (text, graphics, photos and images). Scanning of documents into electronic format is thus an integral part of the computerized personal working station, also.

Separate, independent scanners are accordingly also widely used, generally of two basic types: flat bed scanners and hand-held scanners. Such flat bed scanners embody an electro-mechanical system for document feeding and handling, an electro-optical unit to convert the scanned optical data into electronic signals, an operator control panel, an electronic control and processing unit to control the various system operations, the user input and indicators, and to filter and compress scanned data and generally handle communications with the host computer, and embodying a power supply unit for the electrical and electronic components. This type of scanner can handle high resolution and accurate scanning of a complete range of standard document sizes. Examples of such are the following: AVR 3000/GS Plus: HP Scan-Jet Plus; Microtek MSF-300G; The Complete Flatbed Scanner; UMAX UG80; Abaton Scan 300/GS; Canon IX-30F; Dest PC Scan3000; Xerox Data-copy GS Plus.

Hand scanners have similar components including an electro-mechanical unit for scan speed detection, an electro-optical unit to convert the scanned optical data into electronic signals, control switches and indicators, and an electronic control unit to control the scanning process and to handle communications with the host computer. This type of scanner, however, is far less accurate than the flat bed scanner, since the motion of the scanner along the scanned document is done by hand; and thus such is limited to lower resolution, and consequently to applications which do not require a high level of accuracy. This type is also limited to a narrow scanning path up to about 4.5" only. Examples of such are the following: Nisca Inc. Niscan/GS; Logitech Inc. Scanman 256/GS; The Complete Half-Page Scanner/GS; DFI Inc. DFI CHS-4000; Marstek inc. Mars M-6000 CG; Mirgraph Inc. Mirgraph CS-4096; KYE International Corp. Geniscan GS-C105, Geniscan GS-B105G; Mouse Systems, PC pageBrush/Color; NCL America Clearscan Model 400; Prolab Technology Co. Proscan PS-4000C, PS-4200c.

While currently a keyboard is attached adjacent nearly every computerized working station, such is not the case for scanners. The customary flat bed scanner is far too large to fit on many user tables in addition to the working station CRT-monitor and the keyboard. Due to its size and cost, furthermore, the scanner is generally placed in a central common location within the company and is actually a shared common resource.

While a hand scanner, introduced to provide a solution for "personal scanning" may be small enough to be placed near or at the work station, such a device is at best an inaccurate, low resolution apparatus with limited (4.5") scan width which is much less than the width of standard office documents (8.5×11"). It should be pointed out, moreover, that hand scanner operation is neither easy nor simple.

Since both keyboard and scanner methods of data capture for computerized systems have required different and separate devices, the daily operation is cumbersome and often inefficient. This creates a myriad of problems: file cabinets take up valuable floor space, misfiling causes confusion, paper is easily destroyed, etc. In addition, each of the distinct devices used for data entry has its own direct and indirect costs, and requires its own valuable table space.

It is to the improvement of this requirement for different and usually separate-location data-capture keyboard and scanner devices that the present invention, in a principal measure, is directed; the invention being concerned with the integration of the devices in a novel, efficient and relatively low cost manner.

OBJECTS OF INVENTION

A primary object of the invention, accordingly, is to provide a new and improved method of and station apparatus for integrating keyboard and scanner data capture device mechanically and electronically into a single standard key-board apparatus for interfacing with a computer or the like.

A further object is to provide in such a novel integrated apparatus for sharing keyboard and scanner electronic functions.

Other and further objects will be explained hereinafter and are more particularly delineated in the appended claims.

SUMMARY OF THE INVENTION

In summary, however, from one of its broadest aspects, the invention provides an integrated typed data and optically scanned data capture station for computer interfacing and the like comprising a standard keyboard serving as a common package to include therein an optical scanner. When desired, keyboard control of the scanner is enabled, as is the sharing of keyboard and scanner electronic functions including one or all of cpu, memory and computer communication functions.

Preferred and best mode embodiments and design features are later presented in detail.

DRAWINGS

The invention will now be described in connection with the accompanying drawings, FIG. 1 of which is a system diagram of the integrated apparatus of the invention.

DESCRIPTION OF PREFERRED EMBODIMENT OF INVENTION

Figure 1:
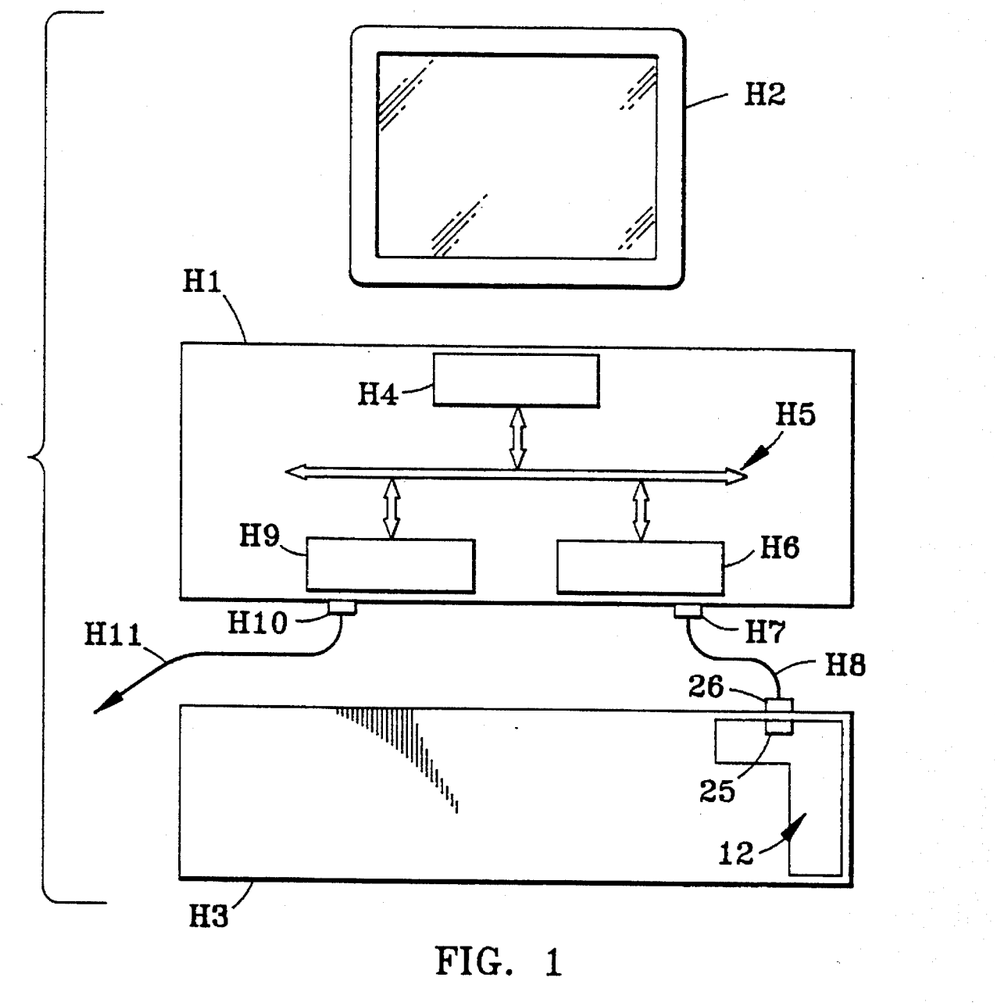
Figure 2:
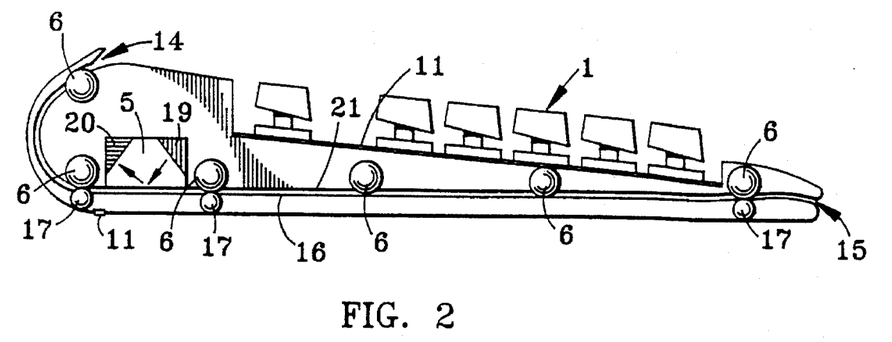
FIG. 2 is a longitudinal section and side view showing details of the construction.
Figure 3:
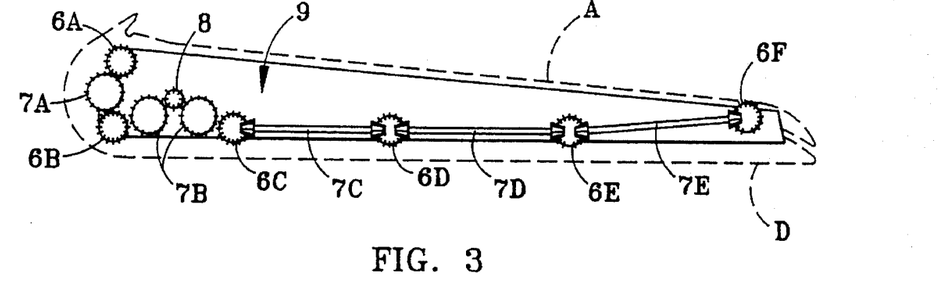
FIG. 3 is a similar view showing document feed power train of the scanner, and FIG. 3A, a simplified mechanical transmission version.

Before proceeding to a description of the preferred construction of FIGS. 1–3, in is believed that an overview of the philosophy and features underlying such construction will be useful in appreciating the context of the invention and its significance in the art.

As above explained, the scanner-keyboard station apparatus of the invention integrates the two basic methods for data capture: typing data using a standard keyboard, and scanning documents using a scanner. The resulting integrated scanner-keyboard is made similar in shape and in sizes to the standard keyboard; but unlike a conventional keyboard, the scanner-keyboard integrates also high-quality scanning capabilities.

Integration housing of the scanner into the standard keyboard structure enabling bringing high quality scanning into each personal computer or work station without losing more table space for additional equipment. The mechanical structure is designed to support an accurate feeding system for the integrated scanner, gaining high quality scanning without the extra space normally required for a bed scanner.

In addition, having the scanner integrated with the keyboard and closely related to the computer enables major cost reductions and efficiency. Among such cost reduction considerations are those achieved by the use of the host computer for power supply needs and for display of scan status and modes; by the use of the keyboard keys for operator control of the scanner; by having one external packaging for both devices; by using the internal keyboard frame to support and house the scanner mechanical feeding system; and by sharing the same electronic board, cpu, memory and communication with the computer by both the keyboard and the scanner.

The major advantage of the scanner keyboard of the invention, of course, is the ability to enter at each user station both typed-in information and high quality scanned documents, using a single, common and compact device.

The basic scanner-keyboard station of the invention comprises the following basic components: a) external packaging (shown at A and D in FIG. 5, as later more fully discussed); b) internal mechanical frames for the standard keyboard and incorporating the scanner (shown at 9, 10 and 11); c) document or paper feed system (shown at 3-4-6-7-8-17); d) document feed path (shown at 14-15-16-21); e) electronic control unit (shown at 12); and f) communication facility (shown at 12, 25 and 26).

Referring to FIG. 1, the integrated scanner-keyboard of the invention is shown at H3, interconnected with a host computer main unit H1 having its monitor H2, main cpu H4, internal bus H5, communication controller H6 and port H7 to the scanner-keyboard H1, the interconnecting cable being illustrated at H8. For possible facsimile use, later explained in detail, a fax modem controller may be provided at H9. Connection to the telephone network is shown effected by a cable H11 from the communications port H10.

Figure 4:
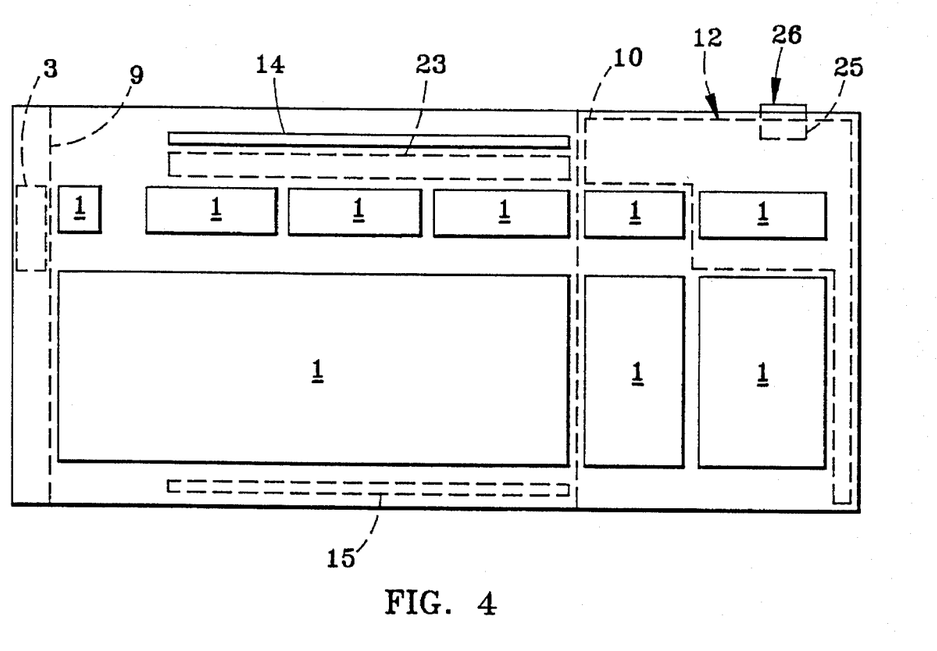
FIG. 4 is an outline or plan view.

Turning to the scanner-keyboard assembly of the invention, in the plan and longitudinal sectional views of FIGS. 4, 2 and 2A, the keyboard keys 1 are shown mounted upon an internal panel 11 serving as the mechanical support therefor, within an internal standard keyboard frame with sidewalls 9, 10 that also support the scanner assembly below the keyboard, with its document guide path 16, 21 under the keyboard, document feed inlet 14 located beyond the top edge of the keyboard, and document outlet 15 disposed beyond the lower edge, adjacent the keyboard user.

Figure 5:
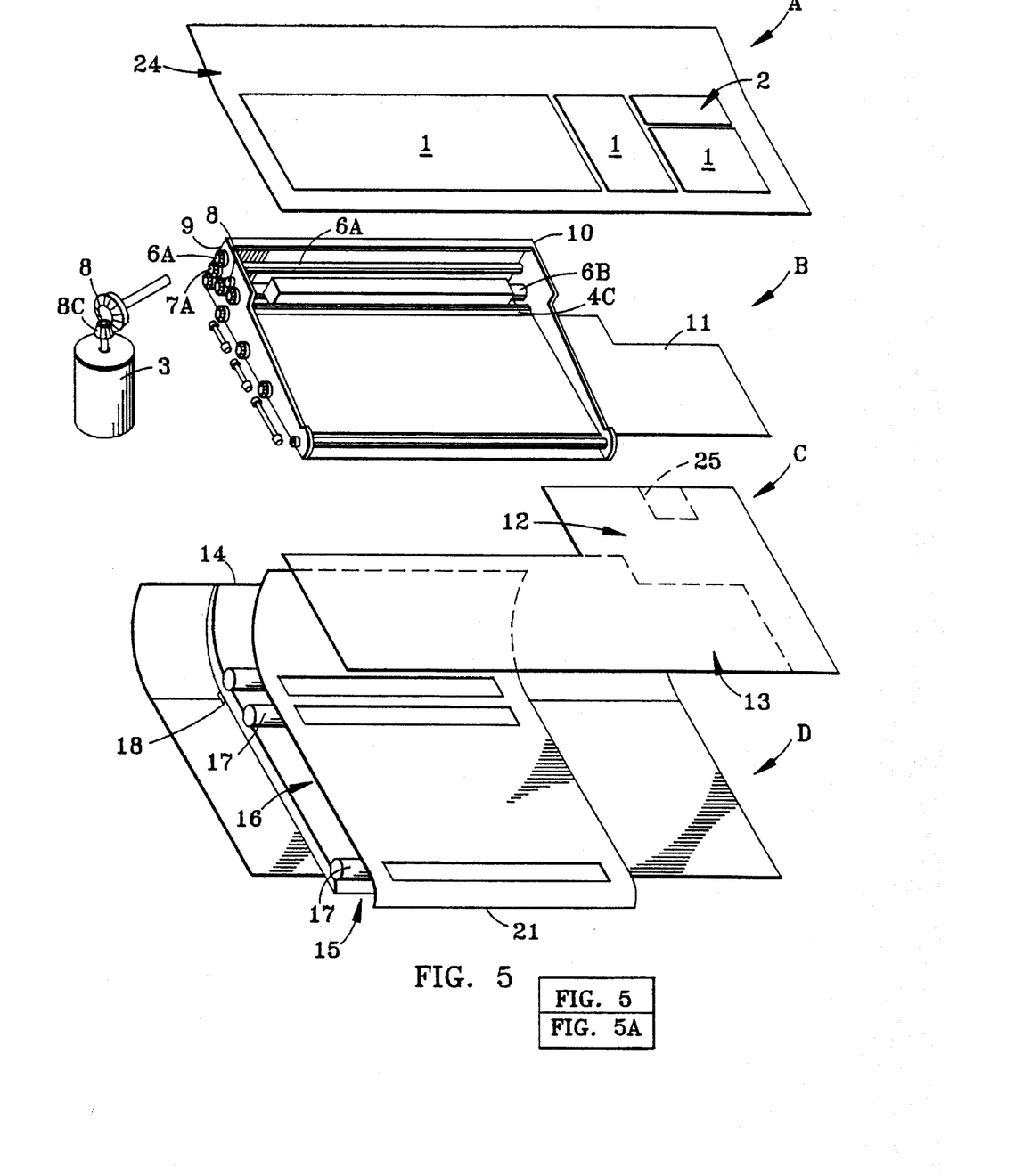
FIG. 5 is an exploded isometric view showing the various layers of the apparatus before integrated assembly.

As more particularly shown in the exploded view of FIG. 5, there are preferably four principal layers to the integrated scanner-keyboard construction of the invention; the uppermost scanner-keyboard packaging plate with the keys, labelled A; an internal mechanical support and document feeding system B; a main scanner-keyboard printed circuit board C; and the base or bottom guide plate D.

In preferred form, as earlier stated, the overall scanner-keyboard external packaging is shown in wedge shape and size(s) similar to standard keyboard packaging. In the internal common mechanical frame system for the keyboard and the scanner, left and right side support frame walls 9 and 10, before mentioned, mount the keyboard support panel 11 and, in addition, also support and house, below and coextensive, at least in part, with the keyboard panel, an accurate scanner document feed system including transversely extending powered feeding rollers 4, nonpowered bottom idle rollers 17, an electronic drive motor 3, and appropriate gear drives 8A and 8B and powered rollers 6A–6C for the integrated scanner, as later more fully described, such construction assuring high quality scanning. The same structure is used also to support the electronic printed circuit board 12, 13. In the modified mechanical drive system of FIG. 5A, a modified mechanical feeding system is shown eliminating some of the drive wheels.

As schematically inferred in FIG. 3, the documents (not shown) inserted into the downwardly concavely curved feed inlet slot 14 beyond the top edge of the keyboard are carried downwardly into the planar document guide path bounded by the upper plate 21 and the lower outer panel L6, thence horizontally underneath and coextensively with the area of the keyboard between the top rollers 6B, 6C and 6A supported by the frame, and bottom idler rollers 17 supported by the outer bottom panel 16; thence emerging at the slightly rising outlet 15, facilitating the right-most drive roller 6A and idler roller 17 in exiting or ejecting the scanned document to the user at exit slot 15.

During such feeding of the document, it passes the optical scanner head 5 with its lamp 19 and sensors 20, FIG. 2, of any well-known type, which, in conventional fashion, converts the scanned image data into electrical signals. A suitable scanner head for this purpose may, for example, be those used in the above-referenced scanner equipments.

The electronic circuit board 12,13 is mounted above the upper cover plate 24 of the document guide path, but its circuits, in well known fashion, control all keyboard and scanner operations. The scanning, handling of keyed data, and transmission to the host computer are controlled by the internal main board 12 with its own cpu memory. The same board is used to mount the conventional keyboard keys section 13. The indicators 2, disposed on the keyboard, FIGS. 1 and 2, such as conventional LED devices, will indicate both keyboard and scanner status. The scanner-keyboard, as before stated, may use the power source of the host computer. Thus, the internal mechanical frames for the keyboard and scanner comprise the left and right support frames 9 and 10 mounted on the standard keyboard support panel 11, with the two frames used to support an accurate feeding system, gaining high quality scanning. The same structure is used also to support the keyboard keys and electronic printed circuit 12–13.

Figure 3A:
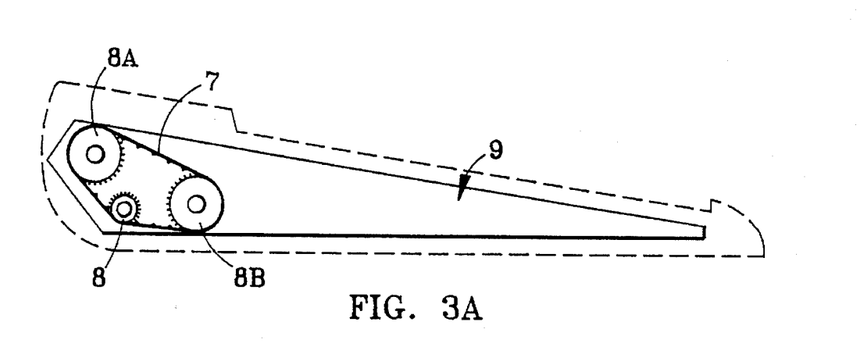
Figure 5A:
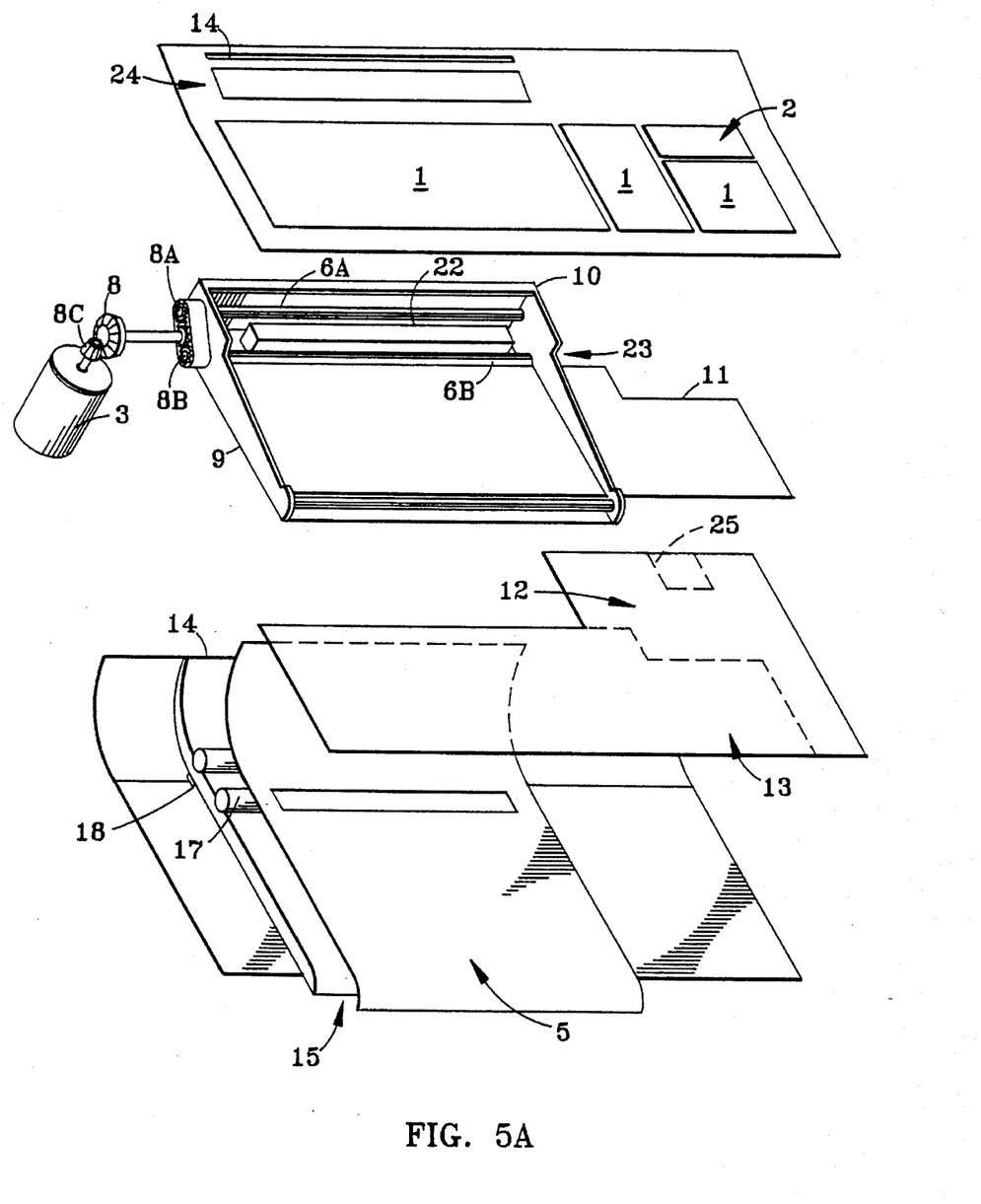
FIG. 5A shows a modified mechanical feed system incorporated in the structure of FIG. 5.

The electric motor 3 carries a first transmission system of bevel and the before-mentioned drive gears 8 and 8c, FIG. 3 and 5. This system transfers power from the motor to powered rollers 6B and 6C. A second transmission system is provided at 7A to transfer power from the powered roller 6B to the powered roller 6A. A third transmission system 7C, 7D, 7E transfers power from rollers 6C to rollers 6D, 6E and 6F disposed laterally along the side of the apparatus. In the modification of FIG. 3A, the mechanical system is simplified and a timing belt 7 is used to transfer power from the motor driven wheel 8 to the powered roller wheels 8A connected to 6A, and 8B. Elements 6C–6F and 7C–7E of FIG. 3 are thus eliminated in this simplification. In the modification of FIG. 5A, similarly, some of the drive wheels are also shown eliminated, with 6A and 6B being the front and rear powered rollers, respectively. The paper or document guided path defined by an upper guide cover plate 24 and a lower outer surface 16 mounting the non-powered or idler rollers 17, provides for smooth paper feeding.

Communication with the host computer H1 by either parallel or serial interface ports, outputting the keyboard typed data and/or the document-scanned data, is shown schematically at control circuit 22 and connector 26.

The document guide bottom plate is shown hinged at 18 to permit its opening for ready maintainence and other access.

In operation of the integrated station of the invention, the user types in data at the keyboard first as if it were a regular keyboard. The user starts the scanning process either by scan command from the host computer (slave mode), or simply by inserting a document into the scanner feeding slot 14 (master mode). Once the document is scanned, it emerges through the exit slot 15 for retrieval by the user. The setting of scanning parameters can be done off-line using the keyboard keys, or online from the host computer system H1 on one application command.

Further in connection with the communication with the host computer, such is schematically shown equipped with a special driver software/hardware interface, to communicate with the scan-keyboard. This driver enables the regular functions of the keyboard and the two before-mentioned modes of scanner operation:

a) Master mode—the scanner automatically starts scanning, initiates communications protocol with the host computer and the host receives the scanned data into a "spool" directory where it is stored for application to retrieve it; and b) Slave mode—the host computer initiates the scanning process utilizing a system command. (SCAN [optional parameters] file name) or special applications computers.

An example of the benefical operation enabled by the invention is the keying of medical patient's records, followed by scanning the physician diagnosis and the laboratory test results. As another example, a document received by mail can be filed in the computer memory along with its scanned image instead of using a paper-filing system.

The present invention can also have a major impact on office operation using copying machines. Today, due to high cost and space requirements, such are office-shared resources. With the integrated apparatus of the present invention, the equipment may often be omitted and replaced by the integrated scanner-keyboard with a personal computer or any other working station. Copying machines, furthermore, are often used to duplicate documents for distribution or filing. Such can be replaced by a scanner-keyboard of the invention with a PC or any other host, using the office or external network for distribution of information and using a laser printer for production of hard copies.

The facsimile or FAX machine, indeed, may be fully replaced by using a computer H1 equipped with internal fax modem board H9, FIG. 1, and a personal integrated scanner of the invention. Suitable fax boards may be the following: Intel 7782 StatiFAXion; The Complete PC Inc. Communicator 5828; Cardinal NM0510, NM0770; Hayes JT fax 9600B Inn.; PowerUser Sendfax 24/48, 24/96; ATI 2400ETC internal; Zoom 9624 Send/receive Int. Fax modem; AFTECH Datafax 2400modem/9600FAX. This configuration, indeed, has some major advantages over the regular fax machines:

Security—the received fax on the computer can be protected from unauthorized reading by regular security tools such as password, magnetic card, etc.

Quality—both for receive and transmit modes, additional inexpensive software tools can be used to improve the images. The office printer can be used for the production of high quality hardcopy output.

Cost—The additional FAX/modem board required, using the equipment of the invention, is considerably less expensive than the cost of fax machines.

The system above described has incorporated the scanner integrally within the standard keyboard frame. While keyboard capability may not change during the life time of the computer, the scanning requirements may evolve in time and may change dramatically even in day-to-day work with different appications (text scanning, OCR applications, high resolution color image processing, etc.

It may thus be desirable in some applications to have the flexibility and option to add a scanning module to the standard keyboard structure or to remove the same, in a convertible manner.

Figure 2A:
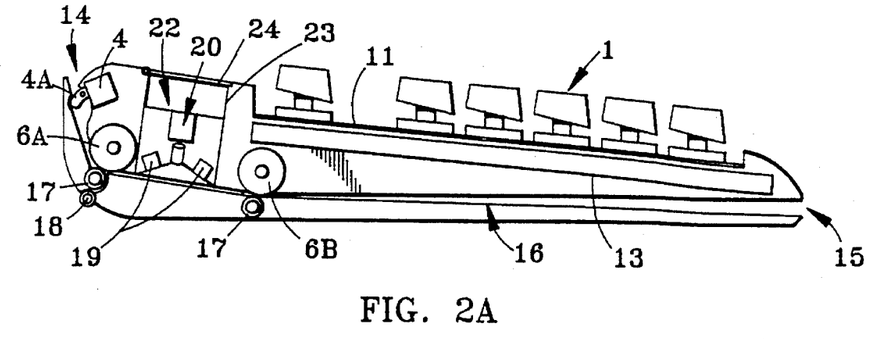
FIG. 2A is a similar view of a simplified mechanical feeding construction on a substantially 1:1 scale of an actual standard keyboard.

The scanner electro-optic converter 20, the light source 19, the lens 21 (optionally with the motor) may thus be organized as a detachable unit 22 as in FIG. 2A. The user can then have a unit without the detachable scanner module for use as a regular keyboard and later, if needed, add the scanning detachable unit and upgrade with scanning capabilities, FIG. 2B. In the office environment, a major cost saving can indeed be achieved by sharing the scanning unit among several such keyboards.

The separation, as described above, has a major advantage. Since the keyboard can be upgraded with a scanning module required for given functions, there may be several scanning detachable units provided with different resolutions, color or black and white capabilities. In the office environment, various detachable units can then be shared by a number of keyboard systems in the same way the old typing machines could switch typing heads for multilingual, multi-font operation.

Figure 2B:
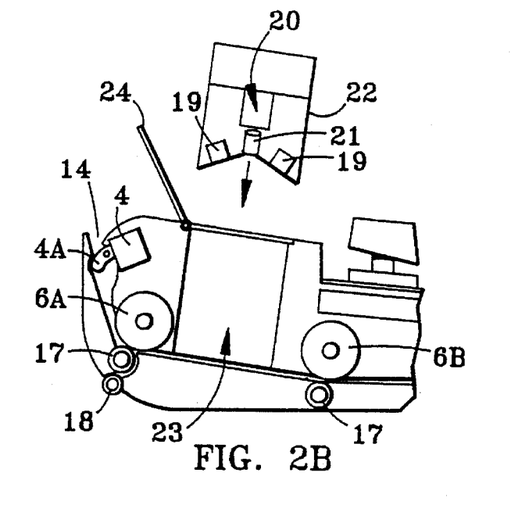
FIG. 2B is a similar fragmentation view showing the modification of an insertable and removable electro-optic module compartment.

In FIGS. 2A and 2B, the light source of the electro-optic module is shown at 19 and the electro-optic converter such as linear CCD device) of the electro-optic module at 20. The lens of the electro-optic module is 21, and the detachable (or fixed) electro-optic module 22 is shown with its electro-optic module compartment 23 and cover 24. In FIG. 2B, the electro-optic module is shown removed from its compartment.

As before discussed, keyboards and scanners are used as input devices for computer software applications. As such, they operate in a "slave" mode. The user may choose to use a scanner for data input by picking scan operation from a menu or typing a special command. The application sets up the scanner into scan mode and the user inserts the paper into the paper feeding slot. A sensor detects the document, scans it and sends the data back to the computer. The application switches the scanner back to the idle state. This is the regular way a scanner keyboard and other auxiliary I/O devices work with the computer.

The main drawback of the "slave" mode of operation, however, is that the user needs to know how to operate the computer and its software applications. There are cases where a user is not familiar with computers but does operate, in day-to-day work, its fax or copy machine. This functionally may exist in the computer but will not be available for such users.

In accordance with a further extension of the present invention, operation in the before-described "master mode" can be attained. In this mode of operation, the master device is the keyboard-scanner of the invention, and the computer is used as a slave output device for display communication and printing. When operating in "master" mode, the keyboard-scanner device can function as three totally different devices. It serves the computer as a regular keyboard; but when the user inserts a document into the document feeding slot 14, a sensor 4, 4a, senses the document and converts the operation of the device from a regular keyboard (slave input device) into an independent fax or copy machine, where the keyboard-scanner is the master device and the computer is used (transparently to the user) as a slave output device.

Figure 6:
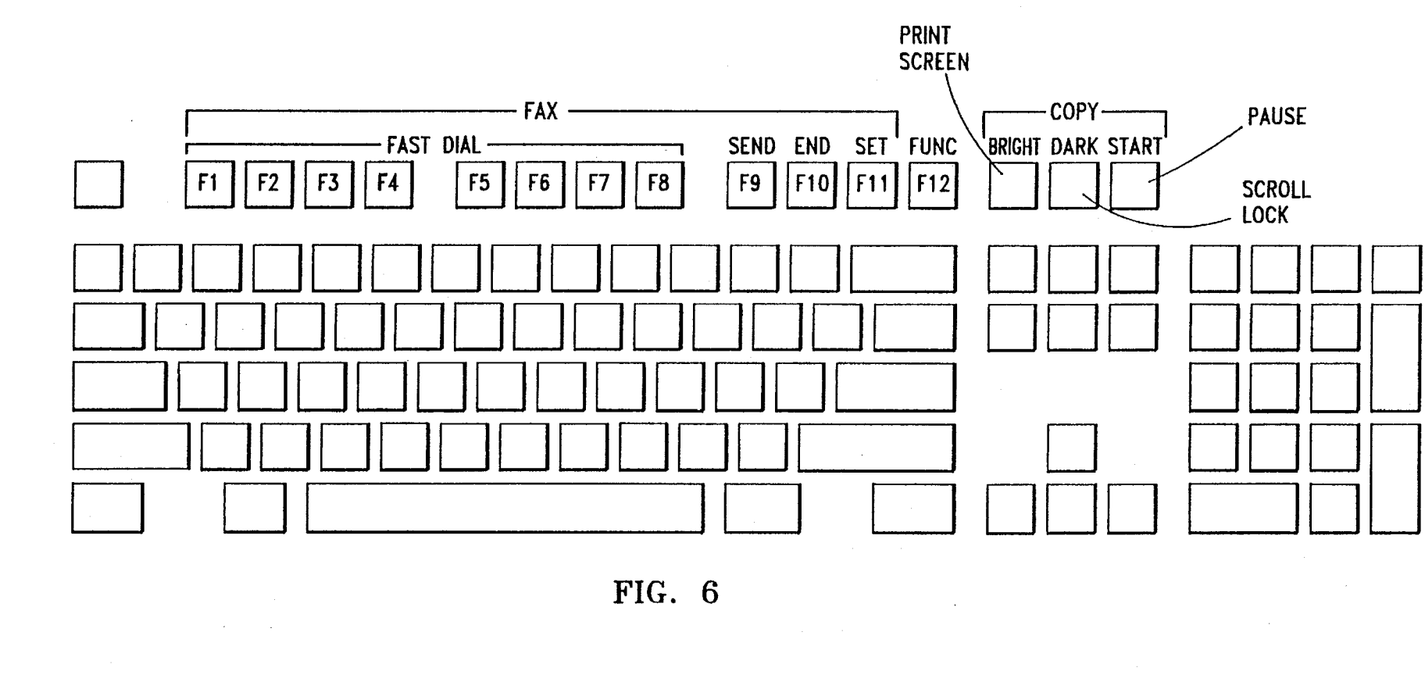
FIG. 6 is a plan view of the keys with special controls for facsimile and other modified features of the invention.
Figure 7:
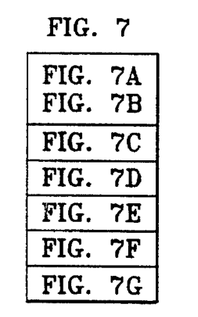
FIGS. 7A–7G are a flow chart for implementing such modified operation.
Figure 7A:
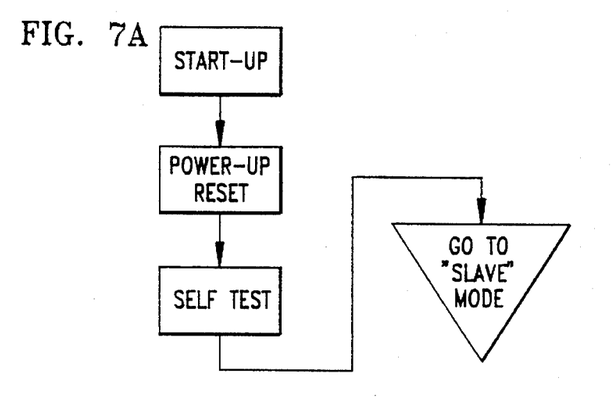
Figure 7B:
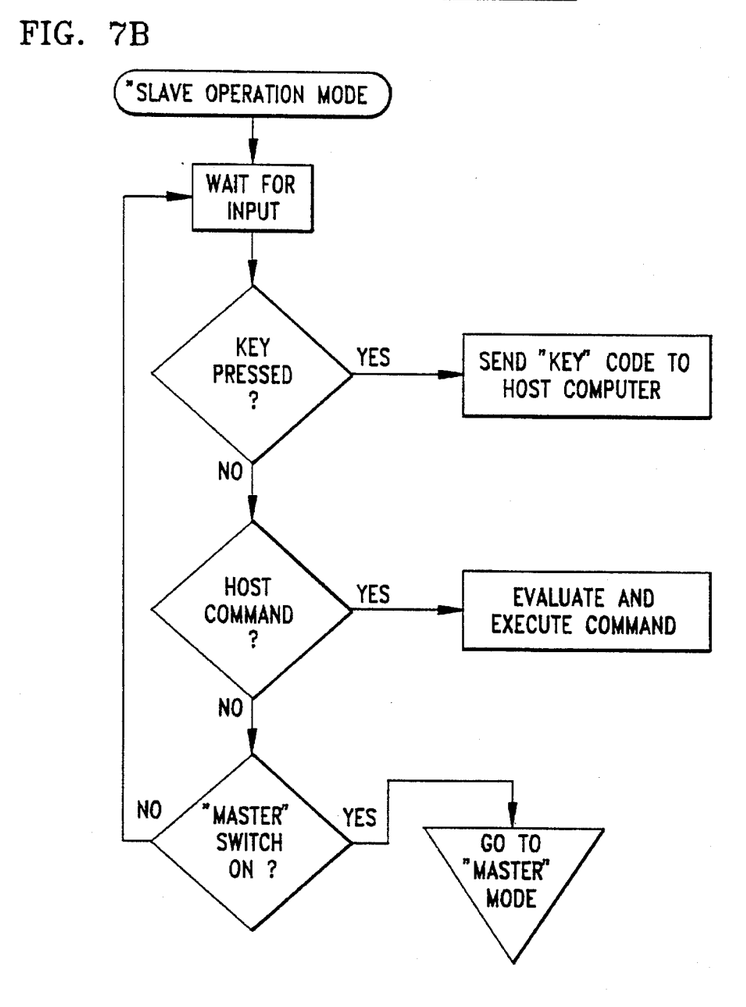
Figure 7C:
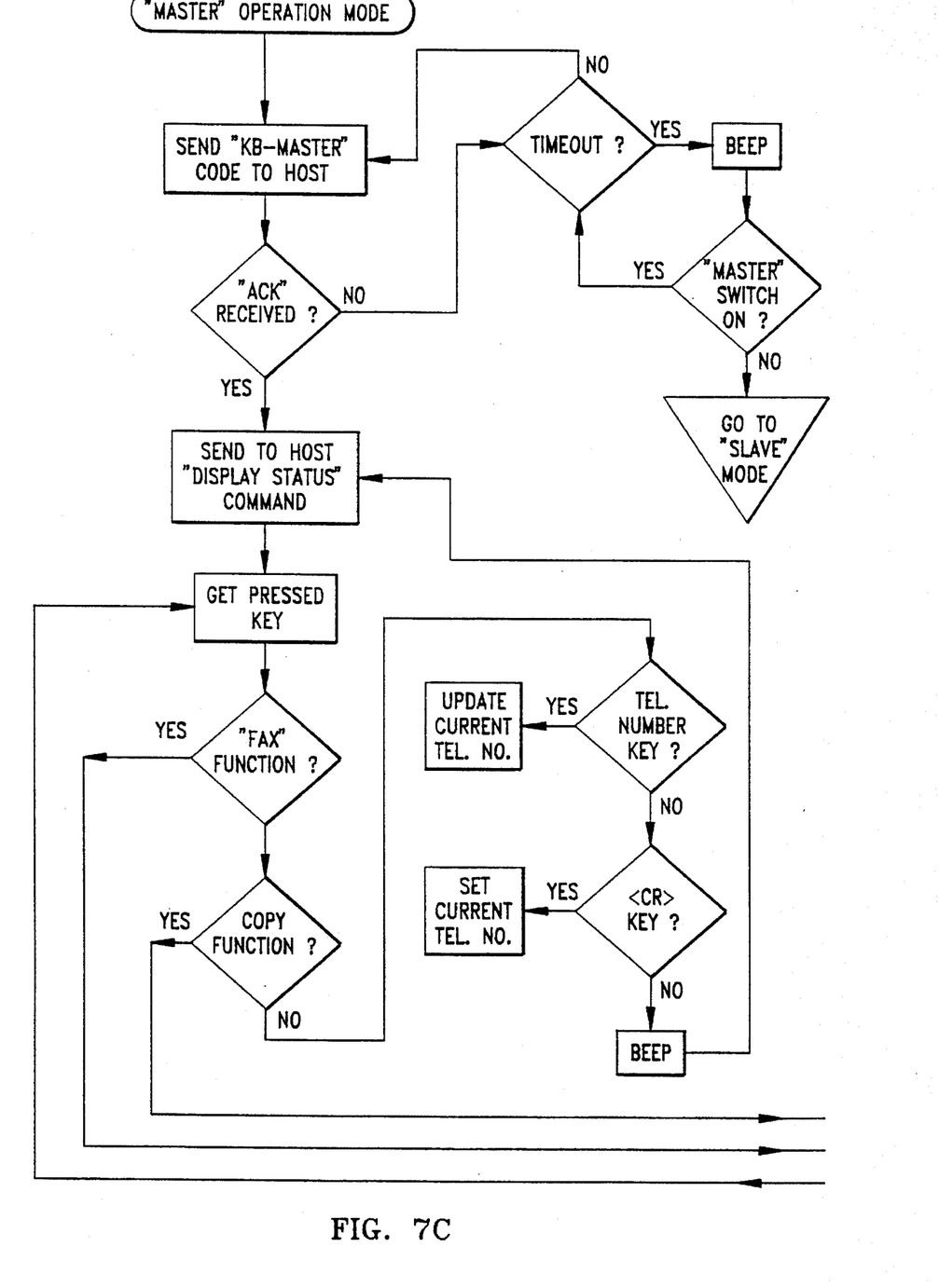
Figure 7D:
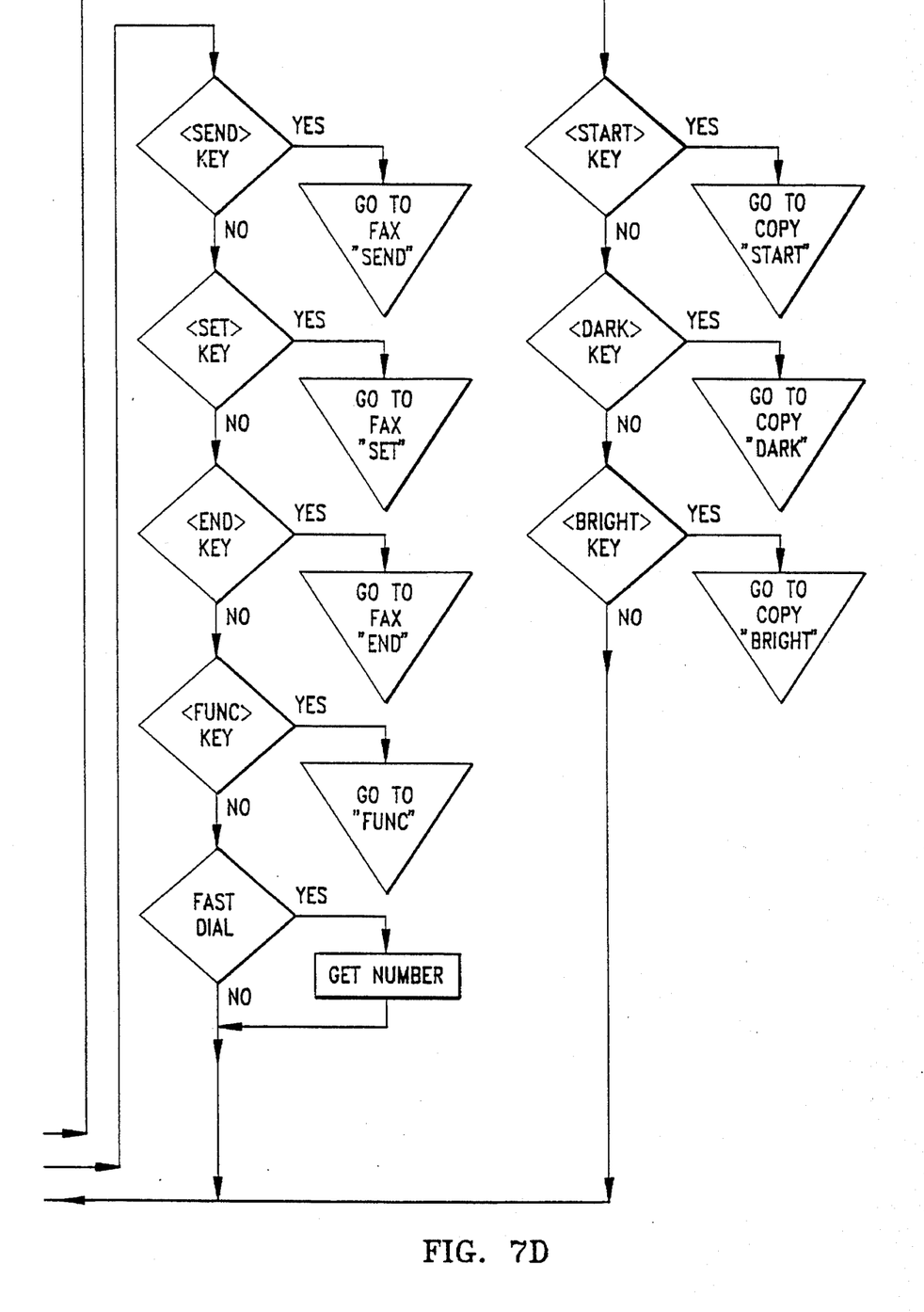
Figure 7E:
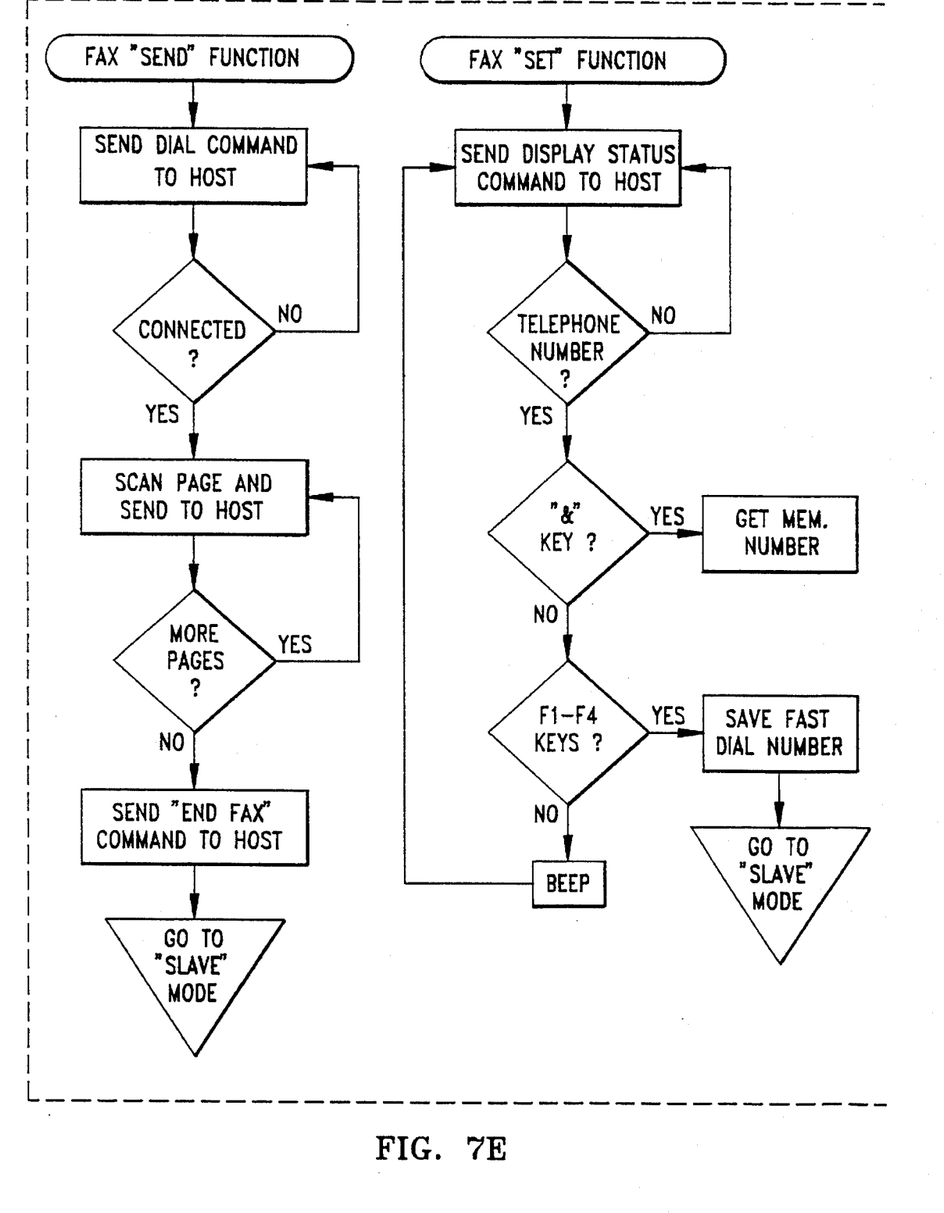
Figure 7F:
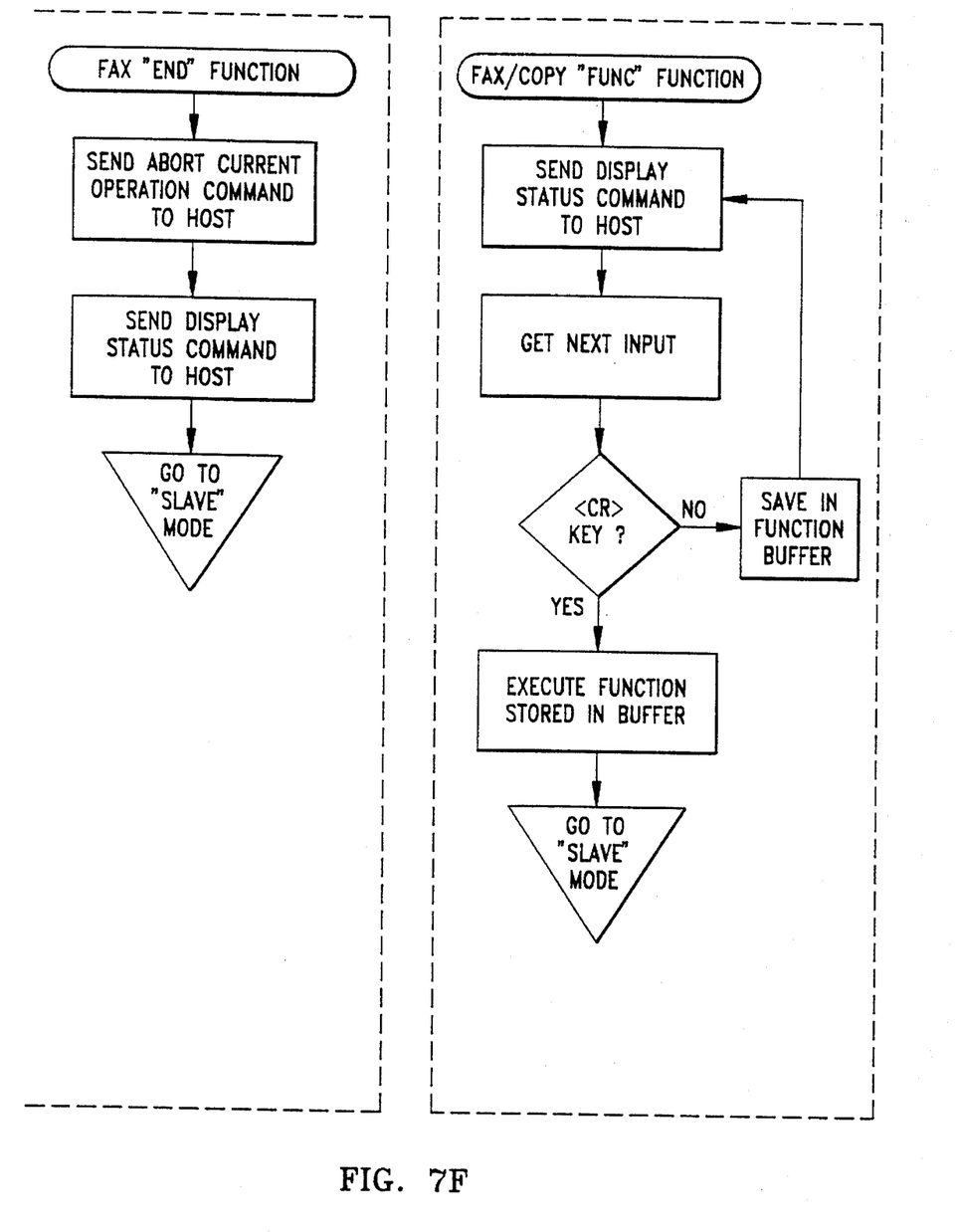

This operation is shown in the flow charts of FIGS. 7A–7F, using the supplemental key controls of FIG. 6. First, the keyboard may operate in its default "slave" mode, as shown in FIGS. 7A and 7B. The user inserts a document into the scanner input slot 14. The inserted document moves the mechanical arm 4A of the document sensor 4. The sensor sets flag "MASTER" ON, which causes the keyboard operation to switch to "fax/copy" machine "MASTER" mode, FIG. 7B, and starts a communication protocol with the host computer to switch its keyboard driver to "keyboard master" mode. In this mode, the keyboard special functions keys automatically convert to "fax/copy" machine functions, FIG. 6, with predefined functions such as SEND FAX, START COPY, FAST DIAL etc.—the operations found on any fax or copy machine.

Figure 7G:
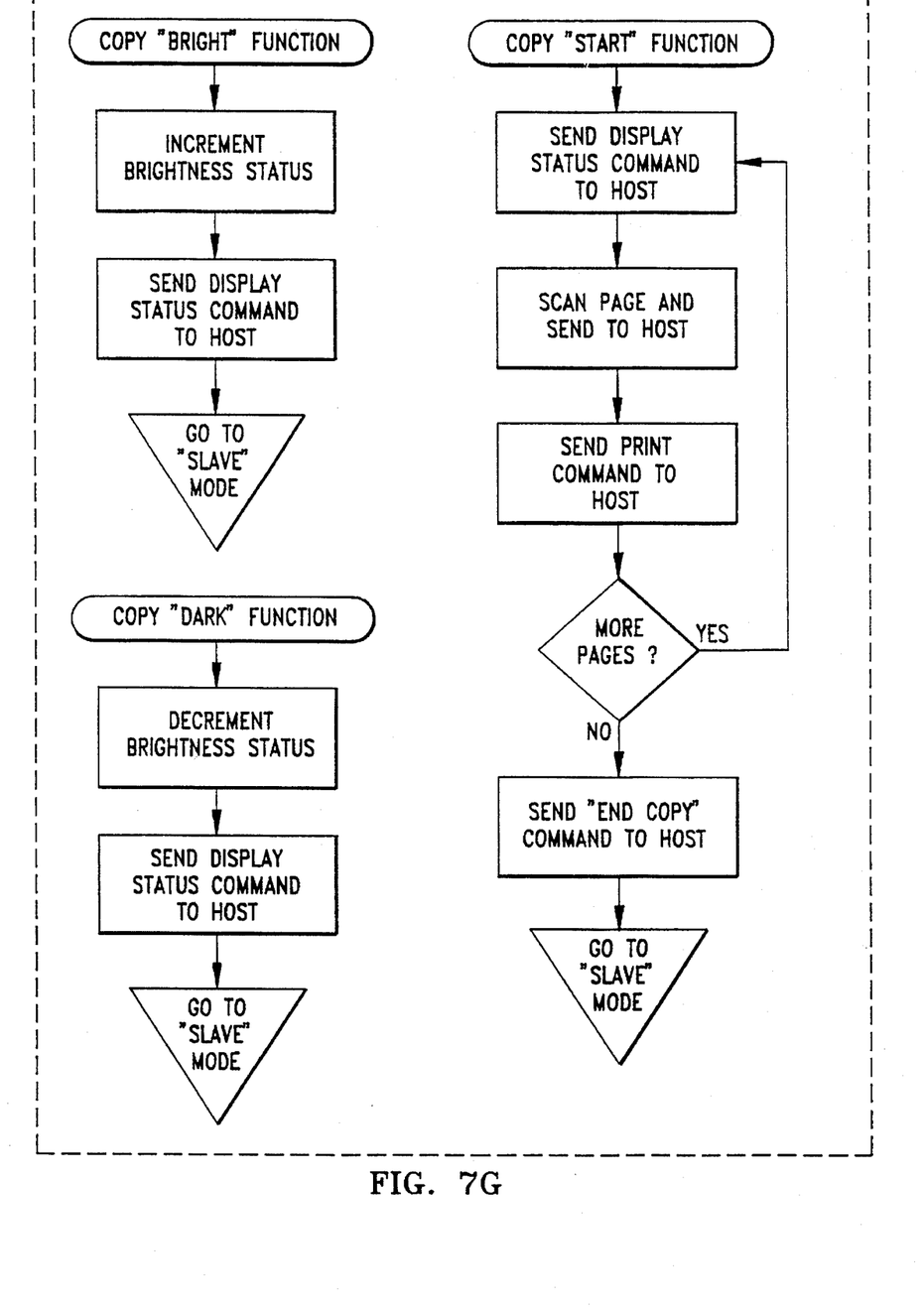

For "fax machine" operation, the user may dial a number or press one of the auto-dial number function keys and than select the "SEND FAX" key. The keyboard-scanner initiates a protocol with the computer which activates the fax transmit driver to send the fax. It may also use the computer display to display the dialed number, the transmitted fax status information, and operation instructions, FIGS. 7C, 7D, 7E, 7F. For "copy machine" operation, the user simply presses the "START" function key and the keyboard-scanner initiates a protocol with the computer to activate a special application which receives the scanned data from the scanner and prints it on the printer, FIGS. 7C, 7D, 7G.

The master mode of operation, moreover, enables untrained people easily to operate the computer as familiar FAX or COPY machines.

More generally, in summary, advantages stemming from the invention include:

1. Reduced space required for the various data capture devices. Scan-keyboard actually brings scan-copy of a document to efficient desktop computer operation without losing any desk space.

2. Enhanced data input operation, ability to combine daze entry of typed alphanumeric information and high quality scanning of drawings and documents.

3. Improved hardware price/performance and reduced direct costs required for data capture devices: instead of keyboards, scanner and fax machines, only the scanner-keyboard of the invention is required, for which only one port of the computer system is sufficient.

4. Reduced indirect costs such as maintenance cost, down-time cost, amortization, etc.

5. Dramatic improvement in use of many computer applications, such as office and desktop publishing, engineering, educational and medical applications, etc. The invention, moreover, is also useful with flatbed type scanners, as shown in FIGS. 8–11, providing the same features of improvement of prior art systems. In the embodiment of FIGS. 8–11, the keyboard structure carrying the scanning head and drive on its underside, rearwardly hinged and lifted open in the direction of the arrows in FIG. 11 at 20' and 21', to receive the document D that is to be scanned upon the bottom flat plate 11' that serves as the document bed. Once the document is so inserted, the integrated keyboard-scanner is then hinged downwardly as at 22' in FIG. 11 to permit the scanning.

Figure 8:
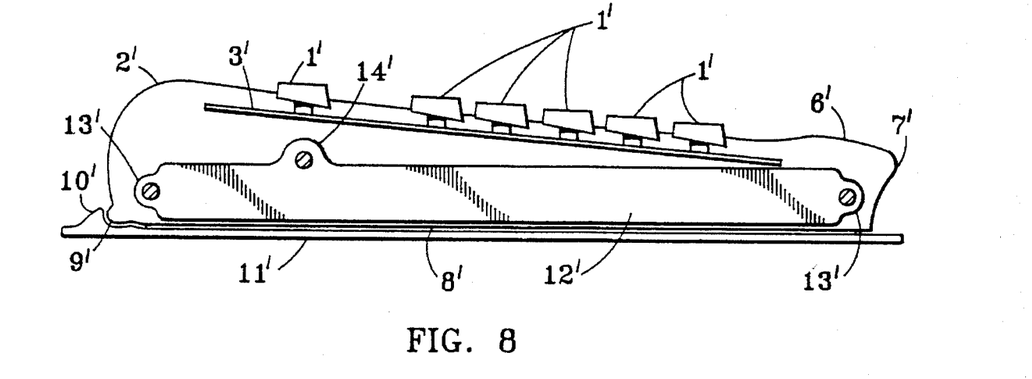
FIG. 8 is a side elevation similar to FIG. 2 of a modified structure adapted for integrating a flatbed type scanner within the standard type keyboard in accordance with the invention.
Figure 9:
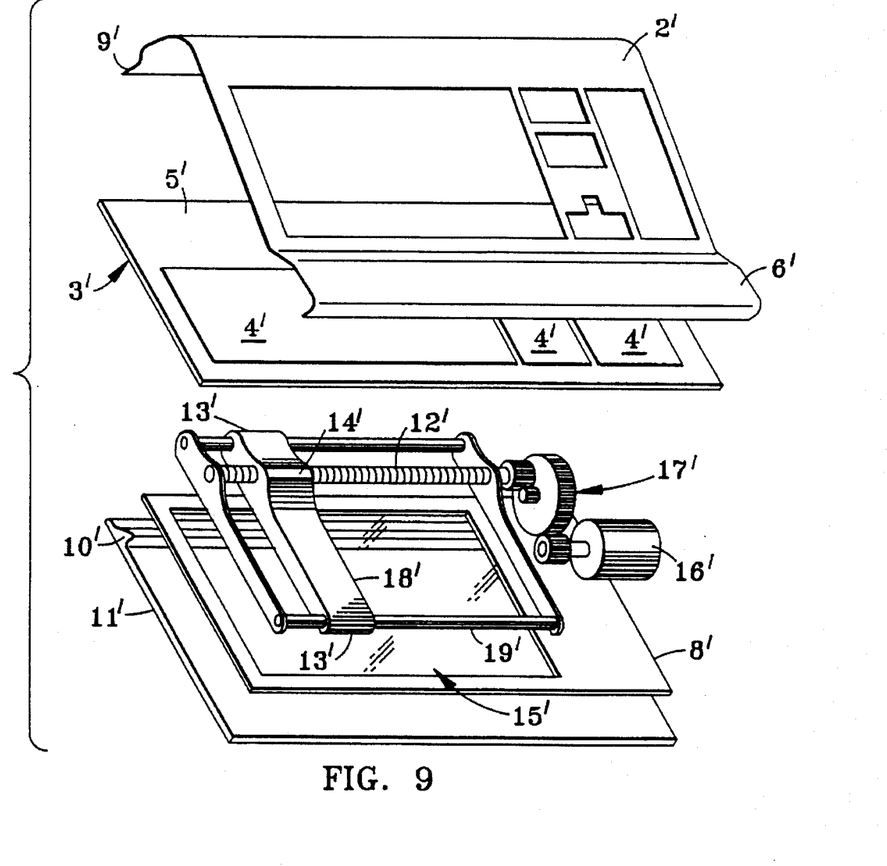
FIG. 9 is an exploded isometric view similar to FIG. 5 of the system of FIG. 8.

In FIGS. 8 and 9, a portion 4' of the printed circuit board 3' is used to mount the keyboard keys 1', with the portion 5' of the board used for the separate and common scanner/keyboard control electronics, as before described. An upper cover 2' is provided for the device and, at 6', an ergonomic pad to support the hands while typing or entering control commands on the keyboard. The forward end 7' is shown preferably curved to ease the above-described lifting open of the keyboard-scanner structure for insertion of the document D as just described with reference to FIG. 11. The structure is provided with a bottom cover 8' including a transparent window 15', FIG. 9 for the integrated scanner, with the before-mentioned document bed plate 11' serving also as a protective bottom cover for the scanner transparent window 15'. A pivot knob 9" is provided to support the keyboard-scanner when lifted from end 7' in order to insert the document, the knob being disposed in an open housing 10'.

Figure 10:
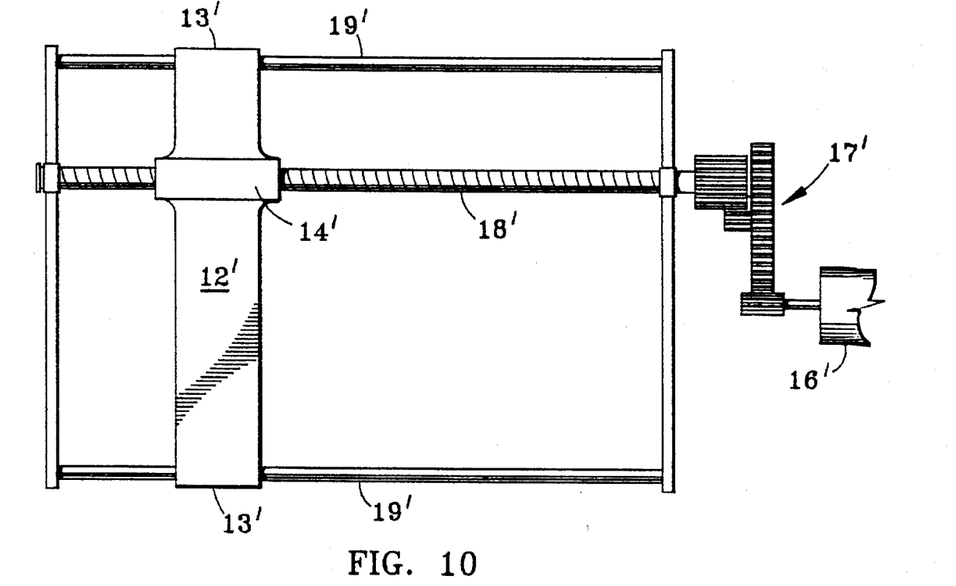
FIG. 10 is a section of an illustrative structure for implementing the electro-mechanical system that controls the movement of the scanner elctro-optical head in the system of FIGS. 8 and 9.
Figure 11A:
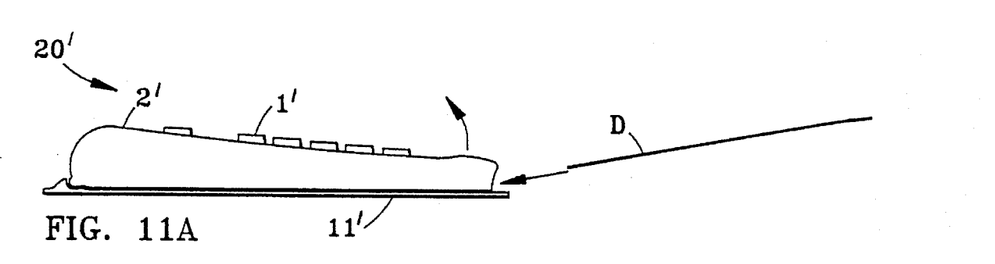
FIGS. 11A–C illustrates successive positions of document insertion under the keyboard for scanning in the modification of FIGS. 8–10.
Figure 11B:
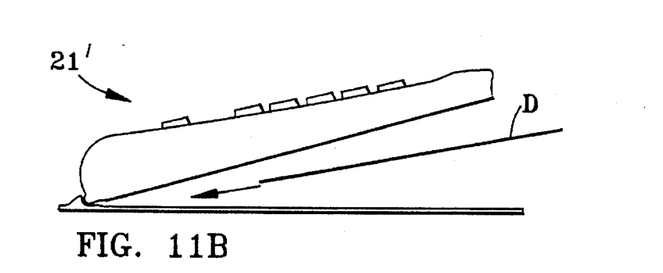
Figure 11C:
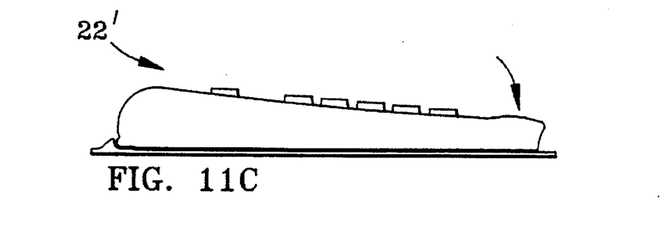

The scanner electro-optical head, as of the before-mentioned types, is shown at 12', provided with a mounting handle 13'. A nut handle 14' and screw 18' translate the electro-mechanical rotation into a longitudinal motion of the scanner head along support rails 19'. The electric drive motor, controlled in response to keyboard command (or, if desired, automatic operation upon the closing of the keyboard-scanner after the document has been received) is illustrated at 16' with its speed-reducing gear system 17', FIG. 10. The particular electro-mechanical system shown implemented in FIG. 10 is, of course, by way of illustration only, with the screw system. 18', 14' that translates rotation into longitudinal motion replaceable with other well-known suitable structures such as timing belts and the like.

While the invention has been described in a preferred constructional format, clearly other well known keyboard-scanner integrating constructions and details may be used or substituted, such being considered, however, to fall within the spirit and scope of the invention as defined in the appended claims.

What is claimed is:

1. An integrated typed data and optically scanned data capture station for computer interfacing and the like, having in combination, a single frame housing mounting and containing both a keyboard and an electro-optical scanner mounted rearwardly of the keyboard on the housing; the scanner having a document insertion guide provided with a slot-opening near the rear and upper portion of the housing beyond the top of the keyboard for introducing a document-to-be-scanned; electronic control and signal processing circuits contained within the housing for controlling the electronic data developed by typing upon the keyboard and the electronic signal data generated by the optical scanning, and interfacing such data with an external computer; wherein means is provided for scanning the documents introduced to the document guide slot within the housing and exiting externally of the housing after scanning.

2. An integrated typed data and optically scanned data capture station as claimed in claim 1 and in which the electronic control and signal processing circuits control such functions as CPU, memory and communication with the computer.

3. An integrated typed data and optically scanned data capture station as claimed in claim 1 and in which the computer interfacing includes means at the scanner for enabling the scanner automatically to start scanning upon insertion of the document in said document guide slot in a master mode and to initiate communications protocol with the computer so that the computer may receive the scanned data and store the same for retrieval.

4. An integrated typed data and optically scanned data capture station as claimed in claim 1 and in which the computer interfacing includes means for enabling the computer to command the scanning by the scanner in a slave mode.

5. An integrated typed data and optically scanned data capture station as claimed in claim 3 and in which the computer interfacing also includes means for enabling the computer to command the scanning by the scanner in a slave mode.

6. An integrated typed data and optically scanned data capture station as claimed in claim 1 and in which the computer is provided with an internal fax modem board interfacing with the scanner and means in the integrated station to send the scanned data to a copier or facsimile machine.

7. An integrated typed data and optically scanned data capture station as claimed in claim 1 and in which the scanner is optionally attached within the housing or detached therefrom to enable either keyboard-scanning joint operation or just keyboard operation alone.

* * * * *